United States Patent
Tesdahl et al.

(10) Patent No.: US 6,901,336 B2
(45) Date of Patent: May 31, 2005

(54) METHOD AND APPARATUS FOR SUPPLYING POWER, AND CHANNELING ANALOG MEASUREMENT AND COMMUNICATION SIGNALS OVER SINGLE PAIR OF WIRES

(75) Inventors: Curtis Alan Tesdahl, Fort Collins, CO (US); David T. Crook, Loveland, CO (US); Kevin G. Chandler, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 127 days.

(21) Appl. No.: 10/404,180

(22) Filed: Mar. 31, 2003

(65) Prior Publication Data

US 2004/0190464 A1 Sep. 30, 2004

(51) Int. Cl.$^7$ .............................................. G01R 19/00
(52) U.S. Cl. ........................... 702/57; 455/69; 700/174; 340/310.01; 340/310.02
(58) Field of Search .............................. 702/57; 455/69, 455/522, 67.11; 700/174; 340/310.01, 310.02; 370/271; 324/416, 458, 508

(56) References Cited

U.S. PATENT DOCUMENTS

| | | | | |
|---|---|---|---|---|
| 4,146,834 A | * | 3/1979 | Maltby et al. ............... | 324/610 |
| 4,742,470 A | * | 5/1988 | Juengel ....................... | 700/175 |
| 4,992,774 A | * | 2/1991 | McCullough ........... | 340/310.01 |
| 5,051,799 A | * | 9/1991 | Paul et al. .................. | 375/242 |
| 5,122,970 A | * | 6/1992 | Gilbert et al. ................ | 702/33 |
| 5,254,953 A | | 10/1993 | Crook et al. | |
| 5,274,336 A | | 12/1993 | Crook et al. | |
| 5,381,417 A | | 1/1995 | Loopik et al. | |
| 5,498,964 A | | 3/1996 | Kerschner et al. | |
| 5,557,209 A | | 9/1996 | Crook et al. | |
| 5,696,451 A | | 12/1997 | Keirn et al. | |
| 6,014,100 A | * | 1/2000 | Fehrenbach et al. ........ | 342/124 |
| 6,408,008 B1 | * | 6/2002 | Komarek et al. ........... | 370/458 |
| 6,690,922 B1 | * | 2/2004 | Lindemann ................... | 455/69 |

\* cited by examiner

Primary Examiner—Carol S. W. Tsai

(57) ABSTRACT

A novel technique for transferring power, measurement signals, and communication signals between two electrical devices over a single wire pair is presented. A host device supplies power to a sensor device over the wire pair. The sensor device obtains A/C signals by modulating the current component of the power signal on the wire pair. The host device de-modulates the current component of the power signal on the wire pair to recover the A/C measurement signals. The sensor device generates a serial bit stream containing sensor communication signals, and modulates it with either the voltage-or current-component of the power signal present on the wire pair. The host device appropriately de-modulates the power signal to recover the serial bit stream containing the sensor communication signals.

16 Claims, 6 Drawing Sheets

METHOD AND APPARATUS FOR SUPPLYING POWER, AND CHANNELING ANALOG MEASUREMENT AND COMMUNICATION SIGNALS OVER SINGLE PAIR OF WIRES

FIELD OF THE INVENTION

The present invention relates generally to electronic devices, and more particularly to a novel technique for providing power, channeling analog measurement signals, and channeling communication signals between two electronic devices using only a single pair of wires.

BACKGROUND OF THE INVENTION

Heretofore, no known technique for providing power, channeling measurement signals, and channeling communications signals over a single pair of wires has existed.

SUMMARY OF THE INVENTION

The present invention is a novel technique for supplying power, and sequentially channeling analog measurement signals and communication signals between electronic devices over a single pair of wires.

In accordance with one preferred embodiment of the invention, a first electronic device is electrically connected to second electronic device via two wires. The first electronic device supplies power to the second electronic device over the two wires. Analog measurement signals may be sent from the second electronic device to the first electronic device. To this end, the second electronic device generates an analog signal of interest and current-modulates it with the current component of the power signal present on the wire pair. The first electronic device demodulates the modulated current component of the power signal present on the wire pair to reproduce the analog signal of interest.

Communication signals may be exchanged between the first and second electronic devices. In a uni-directional communication scheme, communication may be achieved by either voltage-or current-modulating a digital communication signal with either the voltage component or the current component of the power signal present on the wire pair and demodulating the voltage-or current-modulated component of the power signal on the other device to recover the digital communication signal.

In a bi-directional communication scheme, communication may be achieved by voltage-modulating the voltage signal present on the wire pair to indicate communication in one direction between devices, and by current-modulating the current component of the power signal present on the wire pair to indicate communication in the opposite direction between devices.

The described two-wire power, signal, and communication transfer technique may be used, for example, in a system having a measurement probe which senses analog signals that are uploaded to a host instrument for conversion into measurements of interest and further processing. The measurement probe and test instrument may be connected by only two wires over which power, analog measurement signals, and bi-directional communication signals are transferred.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

A novel two-wire power, measurement, and communication signal transfer technique is described in detail hereinafter. Although the invention is described in terms of specific illustrative embodiments, it is to be understood that the embodiments described herein are by way of example only and that the scope of the invention is not intended to be limited thereby.

1. General Embodiment

Figure 1:
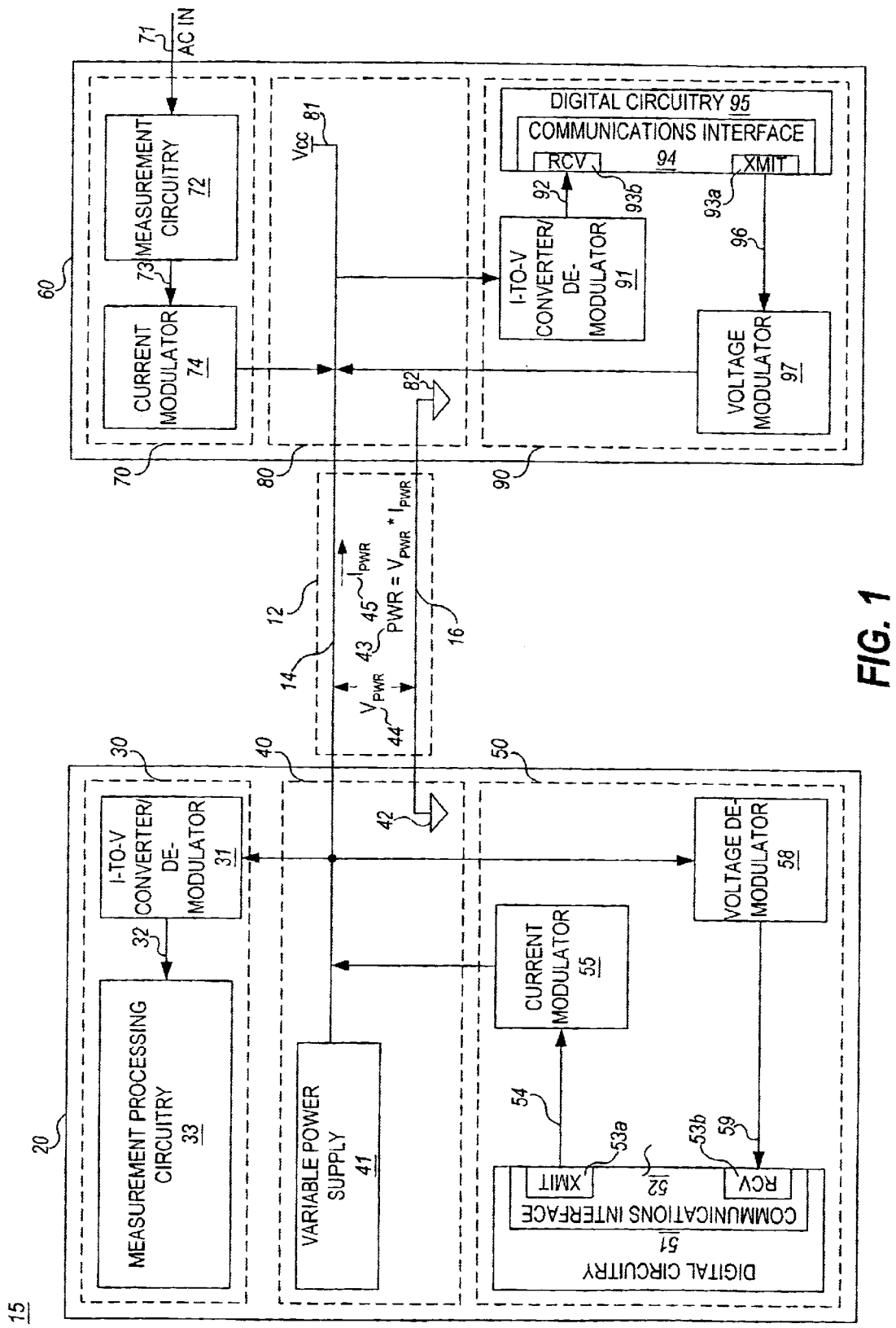
FIG. 1 is a high-level block diagram of a first embodiment of a system implementing the two-wire power, measurement, and communication signal transfer technique of the invention.

Turning now in detail to the drawings, FIG. 1 is a high-level block diagram of a system 15 implementing the two-wire power, measurement, and communication signal transfer technique of the invention. System 15 includes a host device 20 and a sensor device 60. Sensor device 60 is connected to host device 20 via a single wire pair 12 comprising a first wire 14 and a second wire 16.

a. Power Capability

Host device 20 includes a power block 40 with a first and second power source 41 and 42. In the illustrative embodiment, the first and second power sources 41 and 42 are respectively implemented with a power supply and a circuit ground. However, it will be appreciated that the first and second power sources 41 and 42 may be otherwise variously embodied according to other well-known powering standards.

Sensor device 60 includes a power block 80 comprising first and second power source nodes 81 and 82. First and second power source nodes 81 and 82 must be connected to external power sources (such as first and second power sources 41 and 42 in host device 20) in order to operate as power sources within the sensor device 60.

In accordance with the invention, the first wire 14 of wire pair 12 is electrically connected at a first end to the first power source 41 located within the host device 20 and at a second end to the first power source node 81 within the sensor device 60. The second wire 16 is electrically connected at a first end to the second power source 42 located within the host device 20 and at a second end to the second power source node 82 within the sensor device 60. In the preferred embodiment, the first power source 41 is a variable power supply that generates a voltage VCC relative a circuit ground, and the second power source 42 is the circuit ground. In this described capacity, the single wire pair 12 supplies power PWR 43 with a voltage component $V_{PWR}$ 44 and a current component $I_{PWR}$ 45 to the sensor device 60.

b. Measurement Capability

Sensor device 60 includes a measurement signal processing block 70, which includes measurement circuitry 72 and a current modulator 74. Measurement circuitry 72 senses or receives, and otherwise processes, an AC signal 71. The measurement circuitry 72 passes the processed AC signal 73 to current modulator 74. Current modulator 74 current-modulates the processed AC signal 73 by adding an AC component to the DC current in the loop comprised of wire 14 and 16.

Host device 20 includes a measurement signal processing block 30, which includes a current-to-voltage conversion block, de-modulator 31 and measurement processing circuitry 33. Current-to-voltage conversion block and de-modulator 31 receives the modulated current component 44 of the power signal 43 present on the wire pair 12, de-modulates the processed AC signal 32 from the modulated current component 44, and passes the de-modulated processed AC signal 32 to the measurement processing circuitry 33 for further processing and analysis. In this described capacity, the single wire pair 12 operates to channel measurement signals 73 from the sensor device 60 to the host device 20.

c. Communications Capability

In the preferred embodiment, bi-directional communication is achieved as follows:

Sensor device 60 includes a communications block 90, which includes digital circuitry 95, a communications interface 94 having a transmit circuit 93a and a receive circuit 93b. Communications block 90 also includes a voltage modulator 97 and a current de-modulator 91.

Digital circuitry 95 may include a processor, memory, sensors, and/or any other circuit components or devices that generate digital data. Communications interface 94 includes standard circuitry at least for encoding, formatting, and otherwise preparing digital data generated by the digital circuitry for transmission to the host device 20. The transmit circuit 93a generates a serial digital bit stream 96 with the digital sensor data encoded/formatted therein. Voltage modulator 97 voltage-modulates the serial digital bit stream 96 with the voltage component 44 of the power signal 43 present on the wire pair 12.

Host device 20 includes a communications block 50, which includes digital circuitry 51, a communications interface 52 having a transmit circuit 53a and a receive circuit 53b. Communications block 50 also includes a voltage de-modulator 58 and a current modulator 55.

Figure 2A:
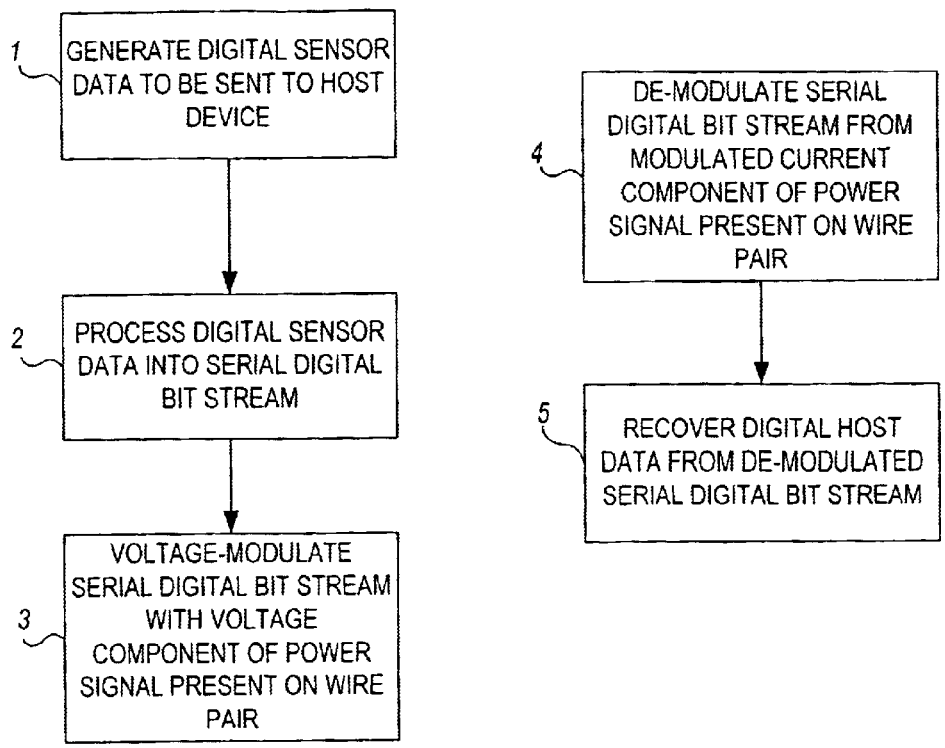
FIG. 2A is an operational flowchart illustrating an exemplary embodiment of a method performed by a sensor device that is implemented in accordance with the first system embodiment of FIG. 1.

FIG. 2A illustrates an exemplary method of operation of the sensor device 60 of FIG. 1. In operation, when sensor device 60 is to send data to the host device 20, digital circuitry 95 on the sensor device 60 generates (step 1) digital data to be sent to the host device 20. The digital data is converted (step 2) to a digital bit stream 96 under the control of the communications interface 94 and transmit circuit 93a. The voltage modulator 97 voltage-modulates (step 3) the digital bit stream 96 with the voltage component 44 of the power signal 43 present on the wire pair 12.

Figure 2B:
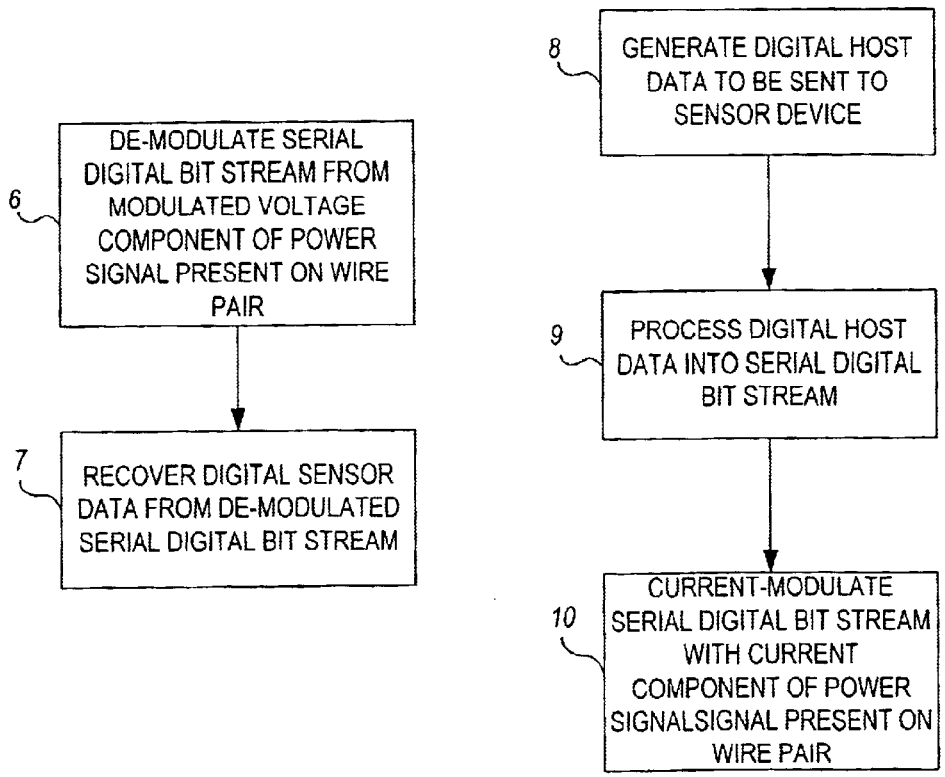
FIG. 2B is an operational flowchart illustrating an exemplary embodiment of a method performed by a host device that is implemented in accordance with the first system embodiment of FIG. 1.

FIG. 2B illustrates an exemplary method of operation of the host device 20 of FIG. 1. On the host end, the voltage de-modulator 58 demodulates (step 6) the serial digital bit stream 96 from the modulated voltage component 44 of the power signal 43 present on the wire pair 12. The receive circuit 53b receives the demodulated serial digital bit stream 59 and passes it on to the communications interface 52 for decoding, deformatting, and otherwise recovering (step 7) the digital data from the bit stream. Digital circuitry 51 may include a processor, memory, sensors, and/or any other circuit components or devices that process the recovered digital data.

Referring still to FIG. 2B, when host device 20 is to send data to the sensor device 60, digital circuitry 51 on the host device 20 generates digital host data to be sent to the sensor device 60 (step 8). The digital host data is processed, converted, and sent out as a serial digital host data bit stream 54 (step 9) under the control of the host communications interface 52 and host transmit circuit 53a. The current modulator 55 current-modulates the serial digital host data bit stream 54 with the current component 45 of the power signal 43 present on the wire pair 12 (step 10).

With reference again to FIG. 2A, on the sensor end, the current de-modulator 91 demodulates the serial digital host data bit stream 92 from the modulated current component 45 of the power signal 43 present on the wire pair 12 (step 4). In the preferred embodiment, the current de-modulator 91 comprises a current-to-voltage converter which converts the modulated current component 45 of the power signal 43 present on the wire pair 12 to a modulated voltage signal, followed by a voltage de-modulator which demodulates the serial digital bit stream 92 from the modulated voltage signal.

The receive circuit 93b receives the demodulated serial digital bit stream 92 and passes it on to the communications interface 94 for decoding, deformatting, and otherwise recovering (step 5) the digital data from the bit stream. Digital circuitry 95 may include a processor, memory, sensors, and/or any other circuit components or devices that process the recovered digital data.

In an alternative embodiment, one-way communication only from the sensor device 60 to the host device 20 is achieved. In this embodiment, the current modulator 55 and transmit circuit 53a in the communications block 50 on the host device 20 may be omitted, and the current de-modulator 91 and receive circuit 93b in the communications block 90 on the sensor device 60 may be omitted.

In yet another alternative embodiment, one-way communication only from the host device 20 to the sensor device 60 is achieved. In this embodiment, the voltage de-modulator 58 and receive circuit 53b in the communications block 50 on the host device 20 may be omitted, and the voltage modulator 97 and transmit circuit 93a in the communications block 90 on the sensor device 60 may be omitted.

In the above-described capacity, the single wire pair 12 operates to channel communication signals between the sensor device 60 and the host device 20 in a bi-directional manner or in a one-way communication in either direction.

Figure 3:
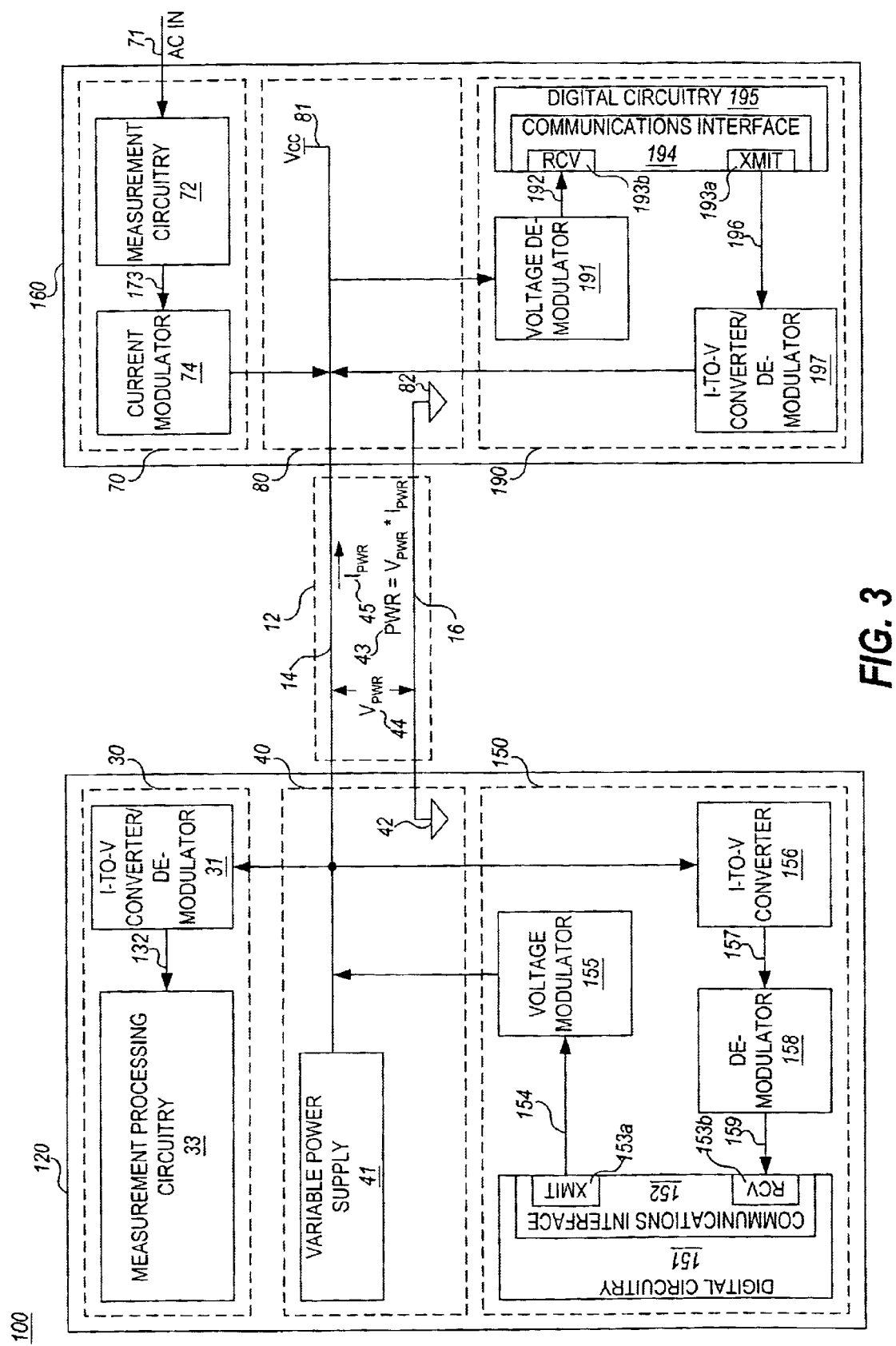
FIG. 3 is a high-level block diagram of an alternative embodiment of a system implementing the two-wire power, measurement, and communication signal transfer technique of the invention.

FIG. 3 is a high-level block diagram of an alternative embodiment of a system 100 implementing the two-wire power, measurement, and communication signal transfer technique of the invention. System 100 includes a host device 120 and a sensor device 160. Sensor device 160 is connected to host device 120 via a single wire pair 12 comprising a first wire 14 and a second wire 16. In this alternative embodiment, sensor device 160 includes a power block 80 and a measurement signal processing block 70 identical to those shown in the sensor device 60 in the embodiment of FIG. 1. Similarly, the host device 120 includes a power block 40 and a measurement signal processing block 30 identical to those shown in the host device 20 in the embodiment of FIG. 1. For the description and operation of these blocks, the reader is referred to the corresponding discussion above with respect to FIG. 1.

In the respective communications blocks 150 and 190 of the host device 120 and sensor device 160, the communication directions corresponding to the modulation of the current and voltage components of the power signal present on the single wire pair 12 are interchanged. More particularly, sensor device communications block 190 includes a current modulator 197 and a voltage de-modulator 191, whereas host device communications block 150 includes a voltage modulator 155 and a current de-modulator 158.

Figure 4A:
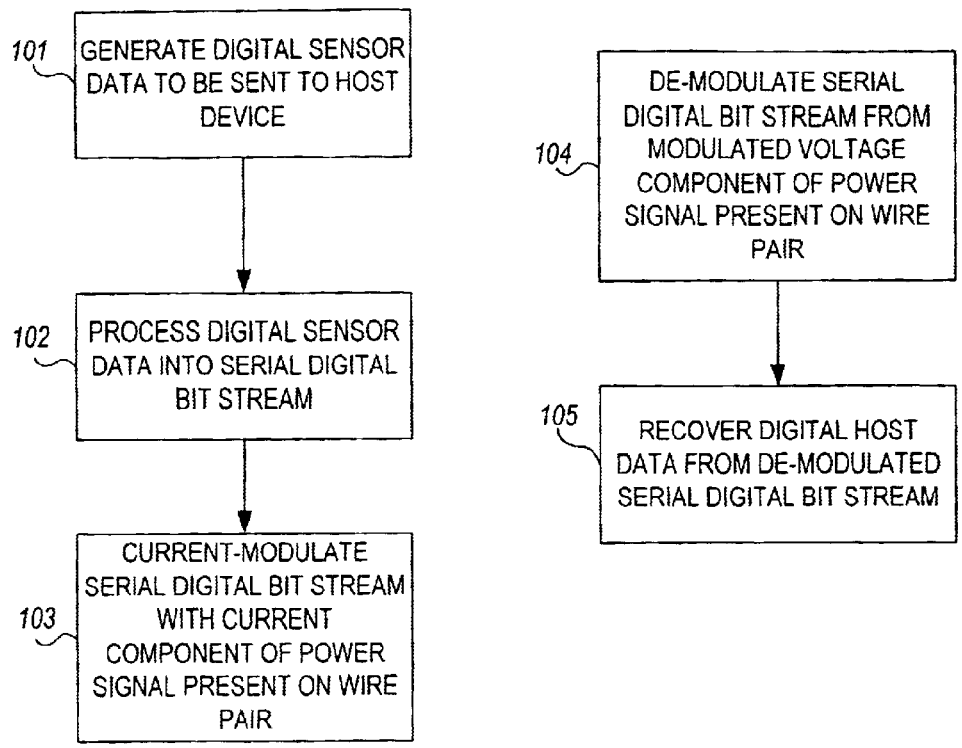
FIG. 4A is an operational flowchart illustrating an exemplary embodiment of a method performed by a sensor device that is implemented in accordance with the second system embodiment of FIG. 3.
Figure 4B:
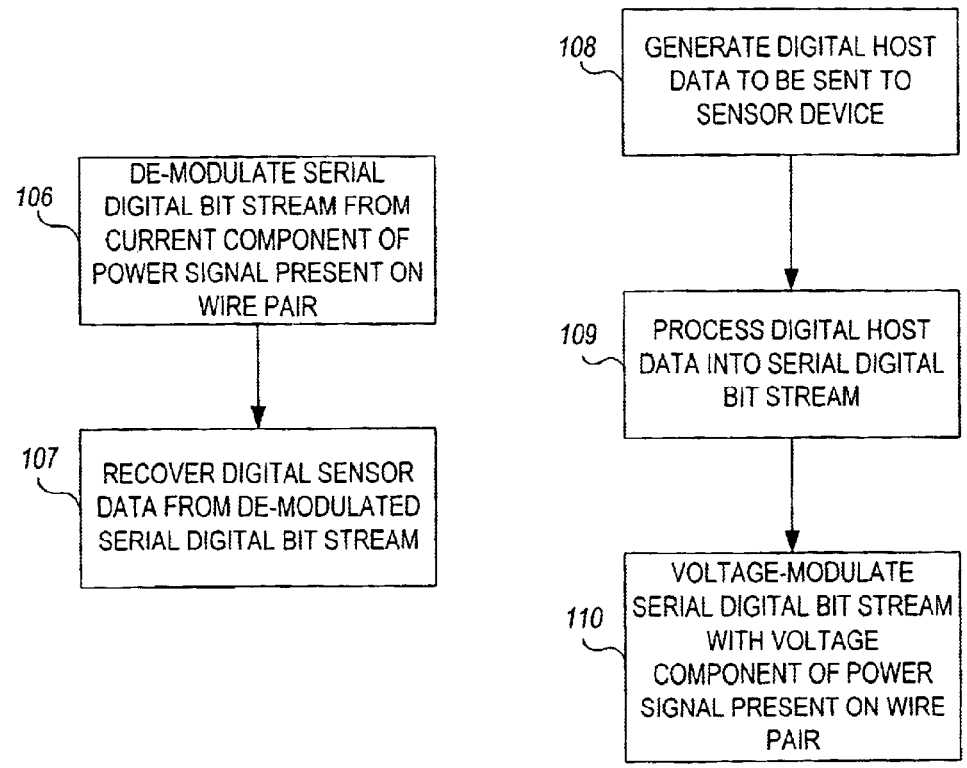
FIG. 4B is an operational flowchart illustrating an exemplary embodiment of a method performed by a host device that is implemented in accordance with the second system embodiment of FIG. 3.

FIG. 4A illustrates an exemplary method of operation of the sensor device 160 of FIG. 3. In operation, when the sensor device 160 generates (step 101) digital sensor data to be sent to the host device 120, the serial digital bit stream 196 generated (step 102) by the collaboration of the digital circuitry 195, communications interface 194, and transmit circuit 193a, is current-modulated (step 103) by current modulator 197 with the current component 45 of the power signal 43 present on the wire pair. FIG. 4B illustrates an exemplary method of operation of the host device 120 of FIG. 3. On the host side, the current de-modulator 156 is connected to receive the current-modulated power signal from the wire pair 12, demodulates (step 106) the serial digital bit stream from the current component 45 of the power signal 43, and passes the demodulated digital serial bit stream on to the receive circuit 153b of the communications interface 152 in the digital circuitry 151 of the host device communications block 150 to recover (step 107) the digital sensor data.

When the host device 120 generates (step 108) digital sensor data to be sent to the sensor device 160, the serial digital bit stream 154 generated (step 109) by the collaboration of the digital circuitry 151, communications interface 152, and transmit circuit 153a in the host device communications block 150, is voltage-modulated (step 110) by voltage modulator 155 with the voltage component 44 of the power signal 43 present on the wire pair 12. On the sensor side, the voltage de-modulator 191 is connected to receive the voltage-modulated power signal from the wire pair 12, demodulates (step 104) the serial digital bit stream from the voltage component 44 of the power signal 43, and passes the demodulated serial digital bit stream on to the receive circuit 193b of the communications interface 194 in the digital circuitry 195 of the sensor device communications block 190 to recover (step 105) the digital data sent to the sensor.

In an alternative embodiment, one-way communication only from the sensor device 160 to the host device 120 is achieved. In this embodiment, the voltage modulator 155 and transmit circuit 53a in the communications block 150 on the host device 120 is omitted, and the voltage de-modulator 191 and receive circuit 193b in the communications block 190 on the sensor device 60 is omitted.

In yet another alternative embodiment, one-way communication only from the host device 20 to the sensor device 60 is achieved. In this embodiment, the current de-modulator 156/158 and receive circuit 153b in the communications block 150 on the host device 120 is omitted, and the current modulator 197 and transmit circuit 193a in the communications block 190 on the sensor device 160 is omitted.

In the above-described capacity, the single wire pair 12 operates to channel communication signals between the sensor device 160 and the host device 120 in a bidirectional manner or in a one-way communication in either direction.

2. Exemplary Embodiment

Figure 5:
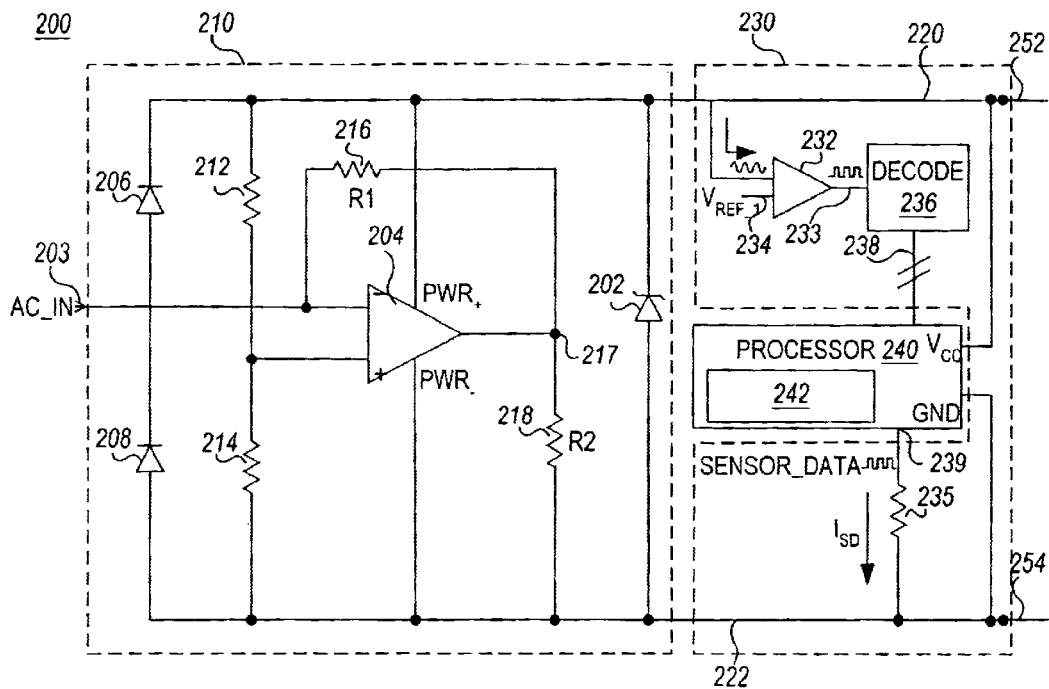
FIG. 5 is a schematic diagram of a preferred embodiment of the electronics in a sensor device that is couplable to a host device via a single wire pair.
Figure 6:
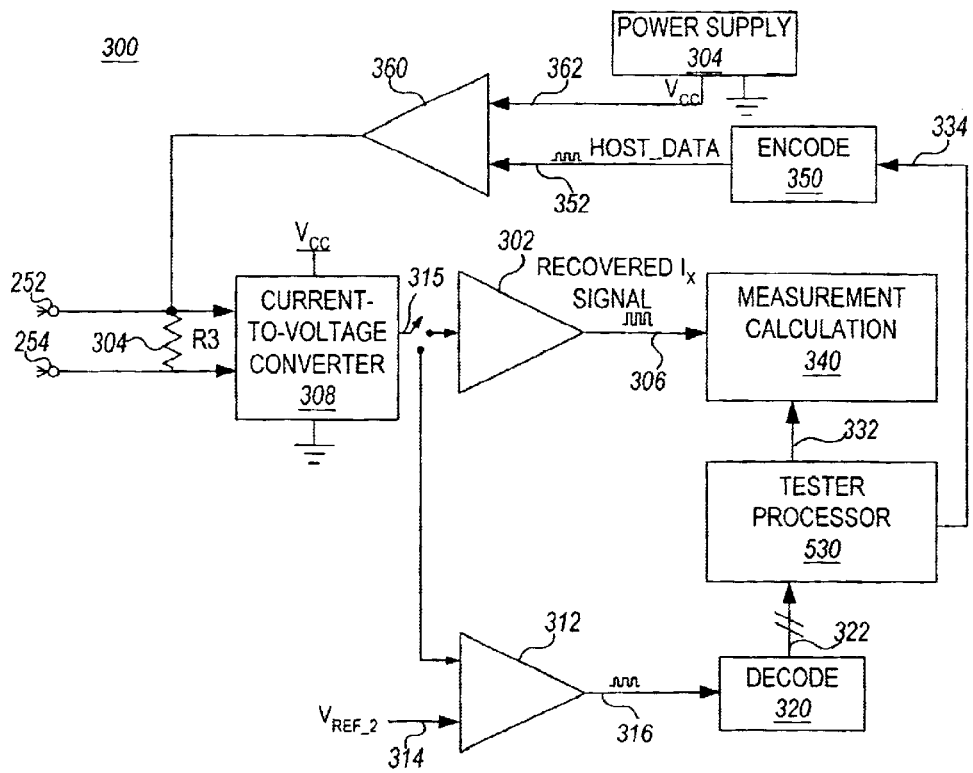
FIG. 6 is a schematic diagram of a preferred embodiment of the electronics in a host device that is couplable to the sensor device of FIG. 5 over the single wire pair.

A preferred embodiment of a host/sensor system is considered in FIGS. 5 and 6.

FIG. 5 is a schematic of a preferred embodiment of the electronics 200 implemented in accordance with the invention. The sensor device electronics 200 includes a measurement circuit in the form of an active amplifier circuit 210, a communications interface 230, a processor 240, and memory 242.

Power is supplied to the sensor device electronics 200 from an external power sources over lines 252 and 254, which are respectively connectable to a first power source node 220 and a second power source node 222.

Referring now to the active amplifier circuit 210, circuit 210 is a standard amplifier circuit used to amplify an AC signal AC_IN 203. Amplifier circuit 210 operates to increase the signal to noise ratio and decrease the effects of stray capacitance. There can be many alternative circuits to accomplish this amplifying effect as would be readily apparent by an artisan in the field. The amplifier 204 is a standard operational amplifier, such as a TL072 by Texas Instruments of Dallas, Tex. Diodes 206 and 208 are standard silicon small signal diodes and diode 202 is a 7.5 V zener diode. Resistors 212 and 214 are 100 K ohm resistors and resistors 216 and 218 are 1 M ohm and 464 ohm resistors, respectively.

In operation, amplifier 204 drives load R2 218. Amplifier 204 has a first power input $PWR_+$ connected to the first power source node 220 and a second power input $PWR_-$ connected the second power source node 222. AC signal AC_IN 203 is received on a first input of the amplifier 204 and a reference signal formed at the junction of resistors 212 and 214 is received on the second input of the amplifier 204. Amplifier 204 drives a voltage across resistor R2 218 that is proportional to the AC input signal AC_IN 203. When the value of the input signal AC_IN 203 is DC or not present, no additional current need to be pulled through the loop. However, when the value of the input signal AC_IN 203 causes the output of the amplifier 204 to vary around its voltage reference level (e.g., 3 V), the power source nodes 220 and 222 must pull additional current through the loop in order to accommodate the voltage change on the output of the amplifier 204. Accordingly, the current over the power loop lines 252 and 254 changes with time based on the AC input signal AC_IN 203. Preferably, the AC input signal AC_IN 203 is a low frequency signal (e.g., 8192 Hz) such that the voltage value of $V_{CC}$ changes slowly with time. In addition, the gain of the amplifier and the value of the resistor R2 218 are preferably such that the impact on the voltage value on $V_{CC}$ is within the sub-millivolt range. This ensures that digital circuitry that is powered by $V_{CC}$ is not adversely impacted.

In the preferred embodiment, the communication interface 230 is a serial interface that generally includes amplification circuitry, sample-and-hold circuitry, frame detection circuitry, and a serial-to-parallel converter. Communication interface 230 may also include error detection/correction circuitry and instruction packet extraction circuitry depending on the communications protocol.

The processor 240 may be implemented by any one or more of the following: microprocessor, microcontroller, ASIC, FPGA, digital state machine, and/or other digital circuitry.

Sensor device 200 is configured to send sensor data to a host device 300 (FIG. 6). In the illustrative embodiment, the digital sensor data is converted from a parallel format to a serial bit stream internal to the processor 240, and output onto the processor's serial output pin 239. Resistor 235 is coupled between serial output pin 239 and the second power source node 222, which is in turn electrically couplable to line 254. Processor 240 has a power input pin $V_{CC}$ connected to the first power source node 220 and a ground input pin GND connected the second power source node 222. In operation, processor 240 outputs a serial digital sensor data bit stream SENSOR_DATA onto pin 239, which drives current $I_{SD}$ across resistor 235. When the value of the digital bit being output onto pin 239 is a logical 0, the output voltage on pin 239 is a zero voltage level and therefore no additional current need to be pulled through the loop. However, when the value of the digital bit being output onto pin 239 is a logical 1, the output voltage on pin 239 is at a logic level high, and therefore the power source nodes 220 and 222 must pull additional current through the loop in order to change the voltage level on the output of the amplifier 204. Accordingly, the current over the power loop lines 252 and 254 changes with time based on the serial digital sensor data bit stream SENSOR_DATA onto pin 239. Preferably, the AC input signal AC_IN 203 is a low frequency signal (e.g., 8192 Hz) such that the voltage value of $V_{CC}$ changes slowly with time. In addition, the gain of the amplifier and the value of the resistor R2 218 are preferably such that the impact on the voltage value on $V_{CC}$ is within the milliVolt range. This ensures that digital circuitry that is powered by $V_{CC}$ is not adversely impacted.

FIG. 6 is a schematic diagram of host circuitry 300 which is couplable over a single wire pair 252 and 254 to a sensor device (such as sensor device 200 in FIG. 5). Host circuitry 300 includes a comparator 302 having a first input connected to line 252 and a second input connected to line 254. The AC signal AC_IN detected by the sensor device 200 of FIG. 5 is de-modulated by the comparator 302. The measurement calculation block 340 receives the de-modulated AC signal 306 at the output of the comparator 302 and performs appropriate measurement calculations.

In order to receive digital sensor data SENSOR_DATA 239 from the sensor device 200, the current-modulated power signal must be demodulated and decoded. To this end, host circuitry 300 includes a current-to-voltage converter 308 which receives the power signal present on lines 252 and 254 and converts the current component to a voltage signal 315. Host circuitry 300 also includes a comparator 312 which receives on one input the converted voltage signal 315 generated by the current-to-voltage converter 308 and on the other input a reference voltage $V_{REF\_2}$ 314. The comparator 512 compares the voltage level of the converted voltage signal 315 with the reference voltage $V_{REF\_2}$ 314 and outputs on line 316 a high voltage level if the modulated signal is above the reference voltage $V_{REF\_2}$ 314 and outputs a low voltage level if the modulated signal is below the reference voltage $V_{REF\_2}$ 314. Accordingly, the output of the comparator 316 is a pulse stream. A decoder 320 is electrically coupled to the output line 316 of the comparator 312 at its input. The decoder 320 converts the pulse stream into parallel instruction responses, which are output on lines 322. Although not shown, the decoder 320 may include synchronization circuitry, sample-and-hold circuits for recovering each bit from the pulse stream, error correction circuitry for verifying proper transmission of the signals, and other standard functionality required for recovering a parallel digital signal from an analog input signal according to the particular transmission implementation. The processor 350 receives the parallel instruction responses from lines 322.

The host device 300 may send digital instructions/data HOST_DATA to the sensor device 200. To this end, the host device 300 generates instructions/data 334 which are encoded by the encode block 350 to generate a serial bit stream HOST_DATA 352. Digital modulator 360 voltage-modulates the serial bit stream HOST_DATA 352 with the raw input signal $V_{CC}$ 362 from power supply 304 to generate a modulated power signal carried over lines 252 and 254. In the preferred embodiment, the raw input signal $V_{CC}$ 362 has an amplitude of 6 V. A high level of the modulated digital signal within the modulated power signal is represented by a voltage level of approximately 6 V and a low level of the modulated digital signal within the modulated power signal is represented by a voltage level of approximately 4.5 V, which is at least above the high signal level threshold of the amplifier circuitry. Accordingly, the digital host data HOST_DATA 352 is carried on the voltage component of the power signal and oscillates above the high signal level threshold (typically 3–4 V) of the amplifier circuitry between 4.5 V and 6 V. Thus, the amplifier circuitry 210 (FIG. 5) is not adversely affected by the signal variation on lines 252 and 254 due to the modulation.

Returning to the sensor device 200 in FIG. 5, digital signals sent to the processor 240 from a host device (such as the host device 300 in FIG. 6) are modulated with the power signal carried over lines 252 and 254 and therefore must be demodulated and decoded into a form required by the processor 240. In order to recover the digital host data HOST_DATA 352 from the modulated power signal carried over lines 252 and 254, in the preferred embodiment, the communications interface 230 therefore includes a comparator 232 which is connected at one input to the first power source node 220 to receive the modulated power signal carried over lines 252 and 254, and on the other input a reference voltage $V_{REF\_1}$. The reference voltage $V_{REF\_1}$ is preferably set at 5 V. The comparator 232 compares the voltage level of the modulated power signal with the reference voltage $V_{REF\_1}$ and outputs on line 233 a digital high voltage level if the modulated power signal is above the reference voltage $V_{REF\_1}$ and outputs a digital low voltage level if the modulated power signal is below the reference voltage $V_{REF\_1}$. Accordingly, the output of the comparator 232 is a serial digital pulse stream. A decoder 236 is electrically coupled to the output line 233 of the comparator 232 at its input. The decoder 236 converts the serial digital pulse bit stream 233 into parallel data, which is output to the processor 240 on lines 238. Although not shown, the decoder 236 may include amplification circuitry, sample-and-hold circuits for recovering each bit from the pulse stream, synchronization (frame detection) circuitry for detecting the beginning and end of each packet, error correction circuitry for verifying proper transmission of the signals, a serial-to-parallel converter, and other standard functionality required for recovering a parallel digital signal from an analog input signal according to the particular transmission implementation.

The processor 240 receives the parallel instruction bits on lines 238, and performs the operation indicated by the instruction.

Figure 7:
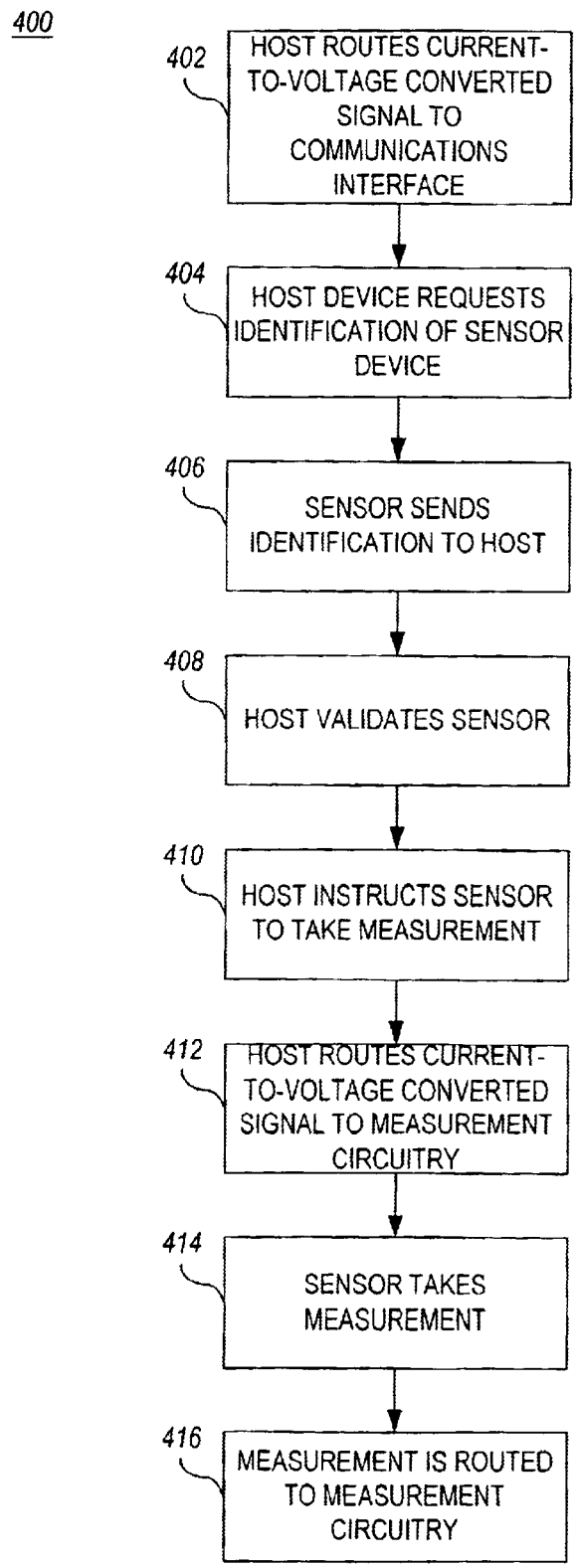

FIG. 7 is an operational flowchart illustrating the transfer of signals between the host device 300 of FIG. 6 and sensor device 200 of FIG. 5. It is to be assumed that power is supplied to the sensor device 200 during all transfer of signals. As illustrated, host device 300 routes the current-to-voltage converted signal 315 to the host communications interface (step 402).

Host device 300 requests sensor device 200 to identify itself (step 404). To accomplish this, the host device 300 generates digital host data HOST DATA 352 containing an appropriate instruction for the sensor device processor 240, and voltage-modulates it with the power signal over lines 252 and 254.

Sensor device 200 responds to the host device 300 with its identification (step 406). To accomplish this, the processor 240 retrieves its identification information from memory 242 and converts it to a serial digital bit stream SENSOR_DATA on 239, where it is current-modulated with the power signal.

Host device 300 verifies the identification information (step 408).

Assuming the identification is valid, host device 300 instructs sensor device 200 to take a measurement (step 410) by generating digital host data HOST DATA 352 containing an appropriate instruction for the sensor device processor 240, and voltage-modulating it with the power signal over lines 252 and 254.

Host device 300 then routes the current-to-voltage converted signal 315 to the host measurement circuitry (step 412). Sensor device 200 then takes an analog measurement (step 414) and current-modulates it with the power signal. The current-modulated measurement is converted to a voltage signal and routed to the measurement circuitry in the host (step 416).

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A sensor device couplable to a host device via a single pair of wires, said single pair of wires comprising a first wire and a second wire, and said host device having a first power source couplable to said first wire and a second power source couplable to said second wire, said sensor device comprising:
    a first power source node couplable to said first wire;
    a second power source node couplable to said second wire;
    a sensing interface operable to sense at least one signal on at least one node under test;
    measurement circuitry operable to generate an a/c sensor measurement signal;
    a first current modulator operable to modulate said a/c sensor measurement signal with a current component of a power signal present on said single pair of wires;
    digital sensor communication circuitry operable to generate a serial digital sensor data bit stream comprising a digital sensor communication signal; and
    a voltage modulator operable to modulate said serial digital sensor data bit stream with a voltage component of said power signal present on said single pair of wires.

2. A sensor device in accordance with claim 1, comprising: a current de-modulator operable to demodulate a current component of said power signal present on said single pair of wires to recover a serial digital host data bit stream; and wherein said digital sensor communication circuitry is operable to recover a digital host communication signal from said recovered serial digital host data bit stream.

3. A host device couplable to a sensor device via a single pair of wires, said single pair of wires comprising a first wire and a second wire, said sensor device comprising a first power source node couplable to said first wire; a second power source node couplable to said second wire; measurement circuitry operable to generate an a/c sensor measurement signal; a first current modulator operable to modulate said a/c sensor measurement signal with a current component of a power signal present on said single pair of wires; digital sensor communication circuitry operable to generate a serial digital sensor data bit stream comprising a digital sensor communication signal; and a voltage modulator operable to modulate said serial digital sensor data bit stream with a voltage component of said power signal present on said single pair of wires, said host device comprising:
    a first power source couplable to said first wire;
    a second power source couplable to said second wire;
    a first current de-modulator operable to de-modulate said a/c sensor measurement signal from said current component of said power signal present on said single pair of wires;
    a voltage de-modulator operable to de-modulate said serial digital sensor data bit stream from said voltage component of said power signal present on said single pair of wires;
    digital host communication circuitry operable to recover a digital sensor communication signal from said recovered serial digital sensor data bit stream.

4. A host device in accordance with claim 3, comprising:
    digital host communication circuitry operable to generate a serial digital host data bit stream comprising a digital host communication signal; and
    a current modulator operable to modulate said serial digital host data bit stream with a current component of said power signal present on said single pair of wires.

5. A system for transferring power, measurement signals, and communication signals over a single wire pair, said single pair of wires comprising a first wire and a second wire, comprising:
    a sensor device comprising:
        a first power source node coupled to said first wire;
        a second power source node coupled to said second wire;
        a sensing interface operable to sense at least one signal on at least one node under test;
        measurement circuitry operable to generate an a/c sensor measurement signal;
        a first current modulator operable to modulate said a/c sensor measurement signal with a current component of a power signal present on said single pair of wires;
        digital sensor communication circuitry operable to generate a serial digital sensor data bit stream comprising a digital sensor communication signal; and
        a voltage modulator operable to modulate said serial digital sensor data bit stream with a voltage component of said power signal present on said single pair of wires; and a host device comprising:
        a first power source coupled to said first wire;
        a second power source coupled to said second wire, said first power source and said second power source operating to supply a power signal to said sensor device over said single pair of wires;
        a first current de-modulator operable to de-modulate said a/c sensor measurement signal from said voltage component of said power signal present on said single pair of wires;
a voltage de-modulator operable to de-modulate said serial digital sensor data bit stream from said voltage component of said power signal present on said single pair of wires;
digital host communication circuitry operable to recover said digital sensor communication signal from said recovered serial digital sensor data bit stream.

6. A system in accordance with claim 5, wherein:
said host device further comprises:
digital host communication circuitry operable to generate a serial digital host data bit stream comprising a digital host communication signal; and
a second current modulator operable to modulate said serial digital host data bit stream with a current component of said power
signal present on said single pair of wires;
and
said sensor device further comprises:
a second current de-modulator operable to demodulate said current component of said power signal present on said single pair of wires to recover said serial digital host data bit stream; and
wherein said digital sensor communication circuitry is operable to recover said digital host communication signal from said recovered serial digital host data bit stream.

7. A sensor device couplable to a host device via a single pair of wires, said single pair of wires comprising a first wire and a second wire, and said host device having a first power source couplable to said first wire and a second power source couplable to said second wire, said sensor device comprising:
a first power source node couplable to said first wire;
a second power source node couplable to said second wire;
a sensing interface operable to sense at least one signal on at least one node under test;
measurement circuitry operable to generate an a/c sensor measurement signal;
a first current modulator operable to modulate said a/c sensor measurement signal with a current component of a power signal present on said single pair of wires;
digital sensor communication circuitry operable to generate a serial digital sensor data bit stream comprising a digital sensor communication signal; and
a second current modulator operable to modulate said serial digital sensor data bit stream with a current component of said power signal present on said single pair of wires.

8. A sensor device in accordance with claim 7, comprising:
a voltage de-modulator operable to demodulate a voltage component of said power signal present on said single pair or wires to recover a serial digital host data bit stream; and
wherein said digital sensor communication circuitry is operable to recover a digital host communication signal from said recovered serial digital host data bit stream.

9. A host device couplable to a sensor device via a single pair of wires, said single pair of wires comprising a first wire and a second wire, said sensor device comprising a first power source node couplable to said first wire, a second power source node couplable to said second wire, a sensing interface operable to sense at least one signal on at least one node under test, measurement circuitry operable to generate an a/c sensor measurement signal; a first current modulator operable to modulate said a/c sensor measurement signal with a current component of a power signal present on said single pair of wires, digital sensor communication circuitry operable to generate a serial digital sensor data bit stream comprising a digital sensor communication signal, and a second current modulator operable to modulate said serial digital sensor data bit stream with a current component of said power signal present on said single pair of wires, said host device comprising:
a first power source couplable to said first wire;
a second power source couplable to said second wire;
a first current de-modulator operable to de-modulate said a/c sensor measurement signal from said current component of said power signal present on said single pair of wires;
a second current de-modulator operable to de-modulate said serial digital sensor data bit stream from said current component of said power signal present on said single pair of wires;
digital host communication circuitry operable to recover a digital sensor communication signal from said recovered serial digital sensor data bit stream.

10. A host device in accordance with claim 9, comprising:
digital host communication circuitry operable to generate a serial digital host data bit stream comprising a digital host communication signal; and
a voltage modulator operable to modulate said serial digital host data bit stream with voltage component of said power signal present on said single pair of wires.

11. A system for transferring power, measurement signals, and communication signals over a single wire pair, said single pair of wires comprising a first wire and a second wire, comprising:
a sensor device comprising:
a first power source node coupled to said first wire;
a second power source node coupled to said second wire;
a sensing interface operable to sense at least one signal on at least one node under test;
measurement circuitry operable to generate an a/c sensor measurement signal;
a first current modulator operable to modulate said a/c sensor measurement signal with a current component of a power signal present on said single pair of wires;
digital sensor communication circuitry operable to generate a serial digital sensor data bit stream comprising a digital sensor communication signal; and
a second current modulator operable to modulate said serial digital sensor data bit stream with a current component of said power signal present on said single pair of wires;
and
a host device comprising:
a first power source coupled to said first wire;
a second power source coupled to said second wire, said first power source and said second power source operating to supply a power signal to said sensor device over said single pair of wires;
a first current de-modulator operable to de-modulate said a/c sensor measurement signal from said current component of said power signal present on said single pair of wires;
a second current de-modulator operable to de-modulate said serial digital sensor data bit stream from said current component of said power signal present on said single pair of wires: and digital host communication circuitry operable to recover said digital sensor communication signal from said recovered serial digital sensor data bit stream.

12. A system in accordance with claim 11, wherein; said host device further comprises:

digital host communication circuitry operable to generate a serial digital host data bit stream comprising a digital host communication signal; and a voltage modulator operable to modulate said serial digital host data bit stream with a voltage component of said power signal present on said single pair of wires;

and said sensor device further comprises:

a voltage de-modulator operable to demodulate said voltage component of said power signal present on said single pair of wires to recover said serial digital host data bit stream; and wherein said digital sensor communication circuitry is operable to recover said digital host communication signal from said recovered serial digital host data bit stream.

13. A method for transferring power, measurement signals, and communication signals between a first electronic device and a second electronic device over a single wire pair, said single wire pair comprising a first wire electrically coupled to a first power source in said first electronic device and to a first power source node in said second electronic device, and a second wire electrically coupled to a second power source in said first electronic device and to a second power source node in said second electronic device, said method comprising:

generating, in said first electronic device, a power signal over said single wire pair;

generating, in said second electronic device, an a/c measurement signal;

modulating, in said second electronic device, said a/c measurement signal with a current component of said power signal present on said single wire pair;

de-modulating, in said first electronic device, said current component of said modulated power signal present on said single wire pair to recover said a/c measurement signal;

generating, in said second electronic device, a first digital communication signal;

processing, in said second electronic device, said first digital communication signal into a first serial digital bit stream;

modulating, in said second electronic device, said first serial digital bit stream with a voltage component of said power signal present on said single wire pair:

de-modulating, in said first electronic device, said voltage component of said modulated power signal present on said single wire pair to recover said first serial digital bit stream; and processing, in said first electronic device, said recovered first serial digital bit stream to recover said first digital communication signal.

14. A method in accordance with claim 13, further comprising the steps of:

generating, in said first electronic device, a second digital communication signal;

processing, in said first electronic device, said second digital communication signal into a second serial digital bit stream;

modulating, in said first electronic device, said second serial digital bit stream with a current component of said power signal present on said single wire pair;

de-modulating, in said second electronic device, said current component of said modulated power signal present on said single wire pair to recover said second serial digital bit stream; and processing, in said second electronic device, said recovered second serial digital bit stream to recover said second digital communication signal.

15. A method for transferring power, measurement signals, and communication signals between a first electronic device and a second electronic device over a single wire pair, said single wire pair comprising a first wire electrically coupled to a first power source in said first electronic device and to a first power source node in said second electronic device, and a second wire electrically coupled to a second power source in said first electronic device and to a second power source node in said second electronic device, said method comprising:

generating, in said first electronic device, a power signal over said single wire pair;

generating, in said second electronic device, an a/c measurement signal;

modulating, in said second electronic device, said a/c measurement signal with a current component of said power signal present on said single wire pair;

de-modulating, in said first electronic device, said current component of said modulated power signal present on said single wire pair to recover said a/c measurement signal;

generating, in said second electronic device, a first digital communication signal;

processing, in said second electronic device, said first digital communication signal into a first serial digital bit stream;

modulating, in said second electronic device, said first serial digital bit stream with a current component of said power signal present on said single wire pair;

de-modulating, in said first electronic device, said current component of said modulated power signal present on said single wire pair to recover said first serial digital bit stream; and processing, in said first electronic device, said recovered first serial digital bit stream to recover said first digital communication signal.

16. A method in accordance with claim 15, further comprising the steps of:

generating, in said first electronic device, a second digital communication signal;

processing, in said first electronic device, said second digital communication signal into a second serial digital bit stream;

modulating, in said first electronic device, said second serial digital bit stream with a voltage component of said power signal present on said single wire pair;

de-modulating, in said second electronic device, said voltage component of said modulated power signal present on said single wire pair to recover said second serial digital bit stream; and processing, in said second electronic device, said recovered second serial digital bit stream to recover said second digital communication signal.

* * * * *

UNITED STATES PATENT AND TRADEMARK OFFICE
CERTIFICATE OF CORRECTION

PATENT NO. : 6,901,336 B2 Page 1 of 1
APPLICATION NO. : 10/404180
DATED : May 31, 2005
INVENTOR(S) : Tesdahl et al.

It is certified that error appears in the above-identified patent and that said Letters Patent is hereby corrected as shown below:

In column 11, line 58, in Claim 8, after "pair" delete "or" and insert -- of --, therefor.

In column 12, line 31, in Claim 10, after "with" insert -- a --.

In column 13, line 2, in Claim 11, after "wires" delete ":" and insert -- ; --, therefor.

In column 13, line 7, in Claim 12, after "wherein" delete ";" and insert -- : --, therefor.

In column 13, line 53, in Claim 13, after "pair" delete ":" and insert -- ; --, therefor.

Signed and Sealed this

Twenty-eighth Day of November, 2006

JON W. DUDAS
*Director of the United States Patent and Trademark Office*